(12) United States Patent
Hashimoto et al.

(10) Patent No.: US 12,466,084 B2
(45) Date of Patent: Nov. 11, 2025

(54) ROBOT SYSTEM AND ROBOT-SYSTEM ASSEMBLING METHOD

(71) Applicant: KAWASAKI JUKOGYO KABUSHIKI KAISHA, Kobe (JP)

(72) Inventors: Takeshi Hashimoto, Kakogawa (JP); Rikuya Uekaji, Kakogawa (JP); John Bright Prakash, Kobe (JP); Shuhei Ishikawa, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 96 days.

(21) Appl. No.: 18/281,365

(22) PCT Filed: Mar. 9, 2022

(86) PCT No.: PCT/JP2022/010218
§ 371 (c)(1),
(2) Date: Sep. 11, 2023

(87) PCT Pub. No.: WO2022/191224
PCT Pub. Date: Sep. 15, 2022

(65) Prior Publication Data
US 2024/0149467 A1  May 9, 2024

(30) Foreign Application Priority Data
Mar. 11, 2021 (JP) ................. 2021-039596

(51) Int. Cl.
*B25J 13/08* (2006.01)
*B25J 19/00* (2006.01)
*B25J 19/06* (2006.01)

(52) U.S. Cl.
CPC ......... *B25J 13/084* (2013.01); *B25J 19/0029* (2013.01); *B25J 19/06* (2013.01)

(58) Field of Classification Search
CPC ....... B25J 13/084; B25J 19/0029; B25J 19/06
See application file for complete search history.

(56) References Cited

U.S. PATENT DOCUMENTS

| 8,863,607 | B2 | 10/2014 | Kume |
| 10,807,252 | B2 | 10/2020 | Nakayama et al. |
| 10,828,791 | B2 | 11/2020 | Fujita |
| 2005/0103148 | A1* | 5/2005 | Inoue ..................... B25J 19/021 74/490.02 |
| 2011/0010011 | A1* | 1/2011 | Oka ....................... B25J 9/1694 700/258 |

(Continued)

FOREIGN PATENT DOCUMENTS

| JP | H07-124886 A | 5/1995 |
| JP | 2004-90152 A | 3/2004 |

(Continued)

OTHER PUBLICATIONS

May 24, 2022 International Search Report issued in International Patent Application No. PCT/JP2022/010218.

*Primary Examiner* — Dale Moyer
(74) *Attorney, Agent, or Firm* — Oliff PLC

(57) ABSTRACT

A robot system includes a jacket-type sensor including a detector included in a jacket and configured to detect a touch on the jacket; and a sensor wiring-line set configured to transmit a detection result from the detector. The sensor wiring-line set is arranged inside the robot arm.

12 Claims, 7 Drawing Sheets

(56) References Cited

U.S. PATENT DOCUMENTS

| | | | | |
|---|---|---|---|---|
| 2017/0066130 A1* | 3/2017 | Corkum | ............... | B25J 9/1676 |
| 2017/0334070 A1* | 11/2017 | Bordegnoni | ......... | B25J 19/0075 |
| 2019/0134810 A1 | 5/2019 | Goto et al. | | |
| 2019/0160688 A1 | 5/2019 | Fujita | | |
| 2020/0368924 A1* | 11/2020 | Neel | ................. | B25J 13/086 |
| 2021/0197381 A1* | 7/2021 | Bordegnoni | ............ | B66F 9/063 |
| 2021/0237286 A1* | 8/2021 | Liu | ....................... | G01D 5/24 |

FOREIGN PATENT DOCUMENTS

| | | | |
|---|---|---|---|
| JP | 3853203 | B2 | 12/2006 |
| JP | 2008-221357 | A | 9/2008 |
| JP | 2011-16183 | A | 1/2011 |
| JP | 4793687 | B2 | 10/2011 |
| JP | 5346105 | B2 | 11/2013 |
| JP | 5552329 | B2 | 7/2014 |
| JP | 5670588 | B2 | 2/2015 |
| JP | 5902664 | B2 | 4/2016 |
| JP | 2017-213674 | A | 12/2017 |
| JP | 6506195 | B2 | 4/2019 |
| JP | 2019-84607 | A | 6/2019 |
| JP | 2019-98407 | A | 6/2019 |

\* cited by examiner

ROBOT SYSTEM AND ROBOT-SYSTEM ASSEMBLING METHOD

TECHNICAL FIELD

The present disclosure relates to a robot system and a robot-system assembling method, and in particular to a robot system including a sensor configured to detect a touch and a method of assembling the robot system.

BACKGROUND ART

Conventionally, robot systems including a sensor configured to detect a touch are known. Such a robot system is disclosed in Japanese Patent Publication No. JP 5902664, for example.

The Japanese Patent Publication No. JP 5902664 discloses a robot including a base, a plurality of link parts (robot arms), and a wrist part. In the Japanese Patent Publication No. JP 5902664, each link includes an external force detection sensor attached to a drive shaft of the link and configured to detect an external force acting on the link. Signals from the external force detection sensor are provided to a control unit. If the external force detected by the external force detection sensor becomes not smaller than a threshold, the control unit stops or slows down a motion of the robot.

PRIOR ART

Patent Document

Patent Document 1: Japanese Patent Publication No. JP 5902664

SUMMARY OF THE INVENTION

Although not stated in the Japanese Patent Publication No. JP 5902664, signals (detection results) from the external force detection sensor will be provided through a wiring-line set (sensor wiring-line set) to the control unit. If the wiring-line set is secured onto and extends along external surfaces of the link parts, the wiring-line set is pulled so that movement of the link parts may be obstructed. For example, one of two link parts, which are connected to each other by a joint, rotates while another is stationary, a part of the wiring-line set secured to the one link rotating is pulled by other part of the wiring-line set secured to the stationary link so that the rotation of the link will be obstructed. For this reason, the wiring-line set necessarily has a sufficient length to prevent such obstruction of movement of the link. However, wires having such a sufficient length will be loose, and as a result the loose parts of wires may be caught on other parts located around the robot.

The present disclosure is intended to solve the above problem, and one object of the present disclosure is to provide a robot system and a robot-system assembling method capable of preventing a sensor wiring-line set from being caught on a part located around the robot arm in a motion of the robot arm while preventing obstruction of the motion of the robot arm.

In order to attain the aforementioned object, a robot system according to a first aspect of the present disclosure includes a robot arm; a jacket-type sensor including a jacket arranged to cover an exterior surface of the robot arm, and a detector included in the jacket and configured to detect a touch on the jacket; and a sensor wiring-line set connected to the detector and configured to transmit a detection result from the detector, wherein the sensor wiring-line set is arranged inside the robot arm.

In the robot system according to the first aspect of the present disclosure, as discussed above, the sensor wiring-line set, which is connected to the detector of the jacket-type sensor and configured to transmit a detection result from the detector, is arranged inside the robot arm. According to this configuration in which the sensor wiring-line set is arranged inside the robot arm, even when a joint of the robot arm rotates, only a part of the sensor wiring-line set that is located on the joint is twisted around a joint axis together with the rotation of the joint, and as a result other part (part located other than the joint) of the sensor wiring-line set is not pulled. In addition, because the sensor wiring-line set connected to the detector of the jacket-type sensor is arranged inside the robot arm, dissimilar to a case in which a sensor wiring-line set is arranged outside the robot arm, it is possible to prevent the sensor wiring-line set from being caught on a part located around the robot arm. Consequently, it is possible to prevent the sensor wiring-line set from being caught on a part located around the robot arm in a motion of the robot arm while preventing obstruction of the motion of the robot arm. In addition, because the jacket-type sensor is used, it is possible to detect a touch on the robot arm in a relatively wide area of the robot arm.

A robot system according to a second aspect of the present disclosure includes a robot arm that includes a jacket-type sensor including a jacket and a detector included in the jacket and configured to detect a touch on the jacket, and has an exterior surface configured to be covered by the jacket-type sensor; and a sensor wiring-line set connected to the detector and configured to transmit a detection result from the detector, wherein the sensor wiring-line set is arranged inside the robot arm.

In the robot system according to the second aspect of the present disclosure, as discussed above, the sensor wiring-line set, which is connected to the detector of the jacket-type sensor and configured to transmit a detection result from the detector, is arranged inside the robot arm. According to this configuration in which the sensor wiring-line set is arranged inside the robot arm, even when a joint of the robot arm rotates, only a part of the sensor wiring-line set that is located on the joint is twisted around a joint axis together with the rotation of the joint, and as a result other part (part located other than the joint) of the sensor wiring-line set is not pulled. In addition, because the sensor wiring-line set connected to the detector of the jacket-type sensor is arranged inside the robot arm, dissimilar to a case in which a sensor wiring-line set is arranged outside the robot arm, it is possible to prevent the sensor wiring-line set from being caught on a part located around the robot arm. Consequently, it is possible to prevent the sensor wiring-line set from being caught on a part located around the robot arm in a motion of the robot arm while preventing obstruction of the motion of the robot arm. In addition, because the jacket-type sensor is used, it is possible to detect a touch on the robot arm in a relatively wide area of the robot arm.

Also, because the sensor wiring-line set is previously arranged inside the robot arm, the robot arm can be easily retrofitted with the jacket-type sensor (in installation site).

A robot-system assembling method according to a third aspect of the present disclosure includes a step of preparing a robot arm including a sensor wiring-line set that is previously arranged inside the robot arm; and a step of attaching, onto an exterior surface of the robot arm, a jacket-type sensor including a jacket and a detector included in the jacket and configured to detect a touch on the jacket and to provide a detection result whereby covering the robot arm with the jacket-type sensor, wherein the step of attaching a jacket-type sensor includes a step of connecting the sensor wiring-line set, which is arranged inside the robot arm, to the detector.

In the robot-system assembling method according to the third aspect of the present disclosure, as discussed above, the sensor wiring-line set, which is connected to the detector of the jacket-type sensor and configured to transmit a detection result from the detector, is arranged inside the robot arm. According to this configuration in which the sensor wiring-line set is arranged inside the robot arm, even when a joint of the robot arm rotates, only a part of the sensor wiring-line set that is located on the joint is twisted around a joint axis together with the rotation of the joint, and as a result other part (part located other than the joint) of the sensor wiring-line set is not pulled. In addition, because the sensor wiring-line set connected to the detector of the jacket-type sensor is arranged inside the robot arm, dissimilar to a case in which a sensor wiring-line set is arranged outside the robot arm, it is possible to prevent the sensor wiring-line set from being caught on a part located around the robot arm. Consequently, it is possible to prevent the sensor wiring-line set from being caught on a part located around the robot arm in a motion of the robot arm while preventing obstruction of the motion of the robot arm. In addition, because the jacket-type sensor is used, it is possible to detect a touch on the robot arm in a relatively wide area of the robot arm.

Also, because the sensor wiring-line set is previously arranged inside the robot arm, the robot arm can be easily retrofitted with the jacket-type sensor (in installation site).

According to this disclosure, as discussed above, it is possible to prevent a sensor wiring-line set from being caught on a part located around a robot arm in a motion of the robot arm while preventing obstruction of the motion of the robot arm.

MODES FOR CARRYING OUT THE INVENTION

One embodiment embodying the present disclosure will be described with reference to the drawings.

The following description describes a configuration of a robot system 100 according to this embodiment with reference to FIGS. 1 to 8.

Figure 1:
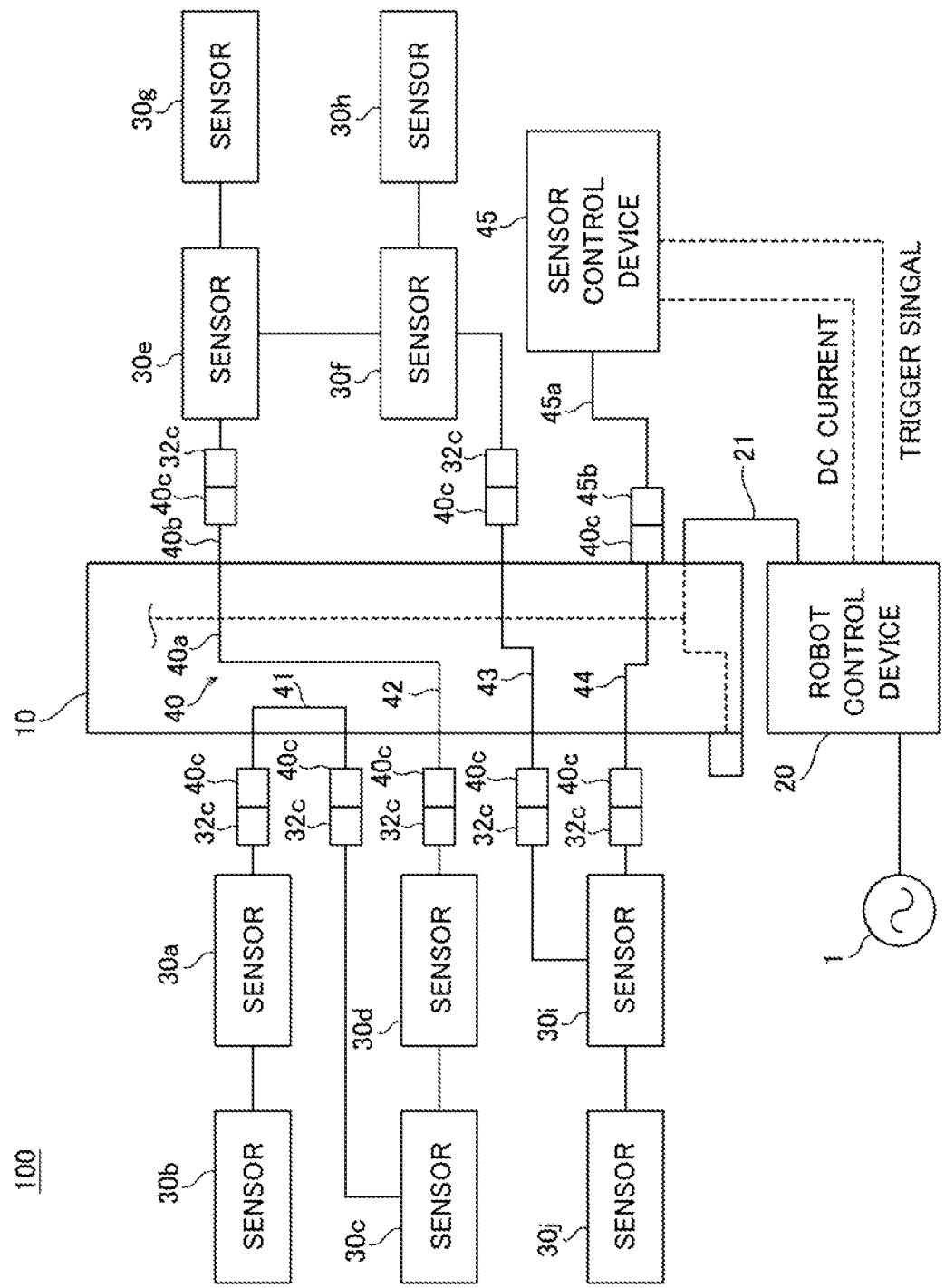
FIG. 1 is a block diagram of a robot system according to one embodiment.

As shown in FIG. 1, the robot system 100 includes a robot 10, and a robot control device 20 configured to control the robot 10. The robot 10 and the robot control device 20 are connected to each other through a robot wiring-line set 21. AC power is supplied from commercial power supply 1 to the robot control device 20. The robot control device 20 is configured to supply AC power supplied from the commercial power supply 1 to the robot 10 through the robot wiring-line set 21 and to control motion of the robot 10.

Figure 2:
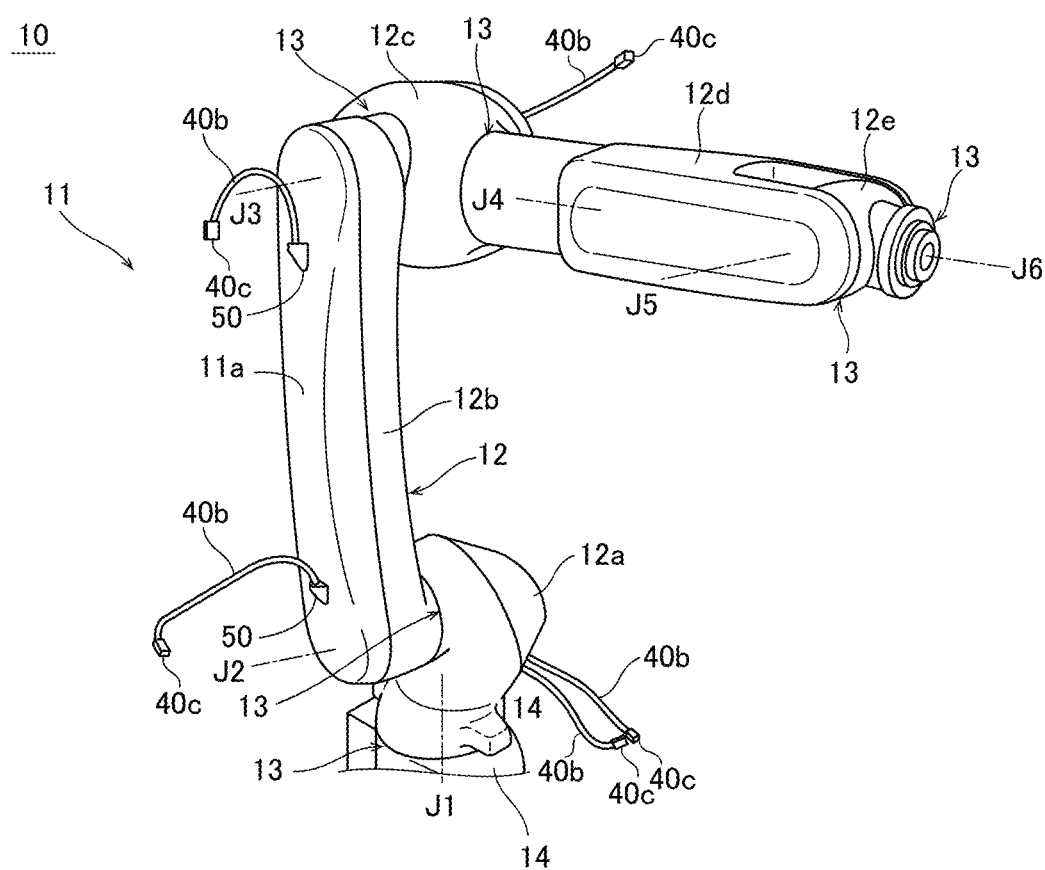
FIG. 2 is a perspective view of the robot (without a jacket-type sensor) according to the one embodiment.

As shown in FIG. 2, the robot 10 includes a robot arm 11. The robot arm 11 includes a plurality of link parts 12 (link parts 12a to 12e). The plurality of link parts 12 are coupled to each other by joints 13. A plurality of joints are provided as the joints 13. For example, six joints 13 are provided. In other words, the robot 10 is constructed of a 6-axis (J1 to J6) multi-joint robot arm. Each of the joints 13 includes an electric motor (not shown). The robot arm 11 is supported by a base 14. An end effector 15 (see FIG. 5) is attached to a free end of the robot arm 11. The robot 10 may be constructed of a vertical multi-joint robot having joint axes other than 6 axes, a double arm robot or a horizontal multi-joint robot.

Figure 3:
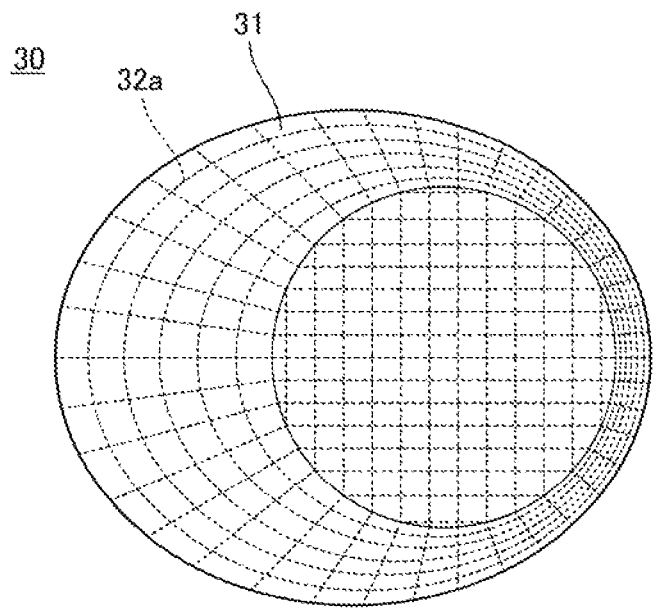
FIG. 3 is a surface-side view of the jacket-type sensor.
Figure 4:
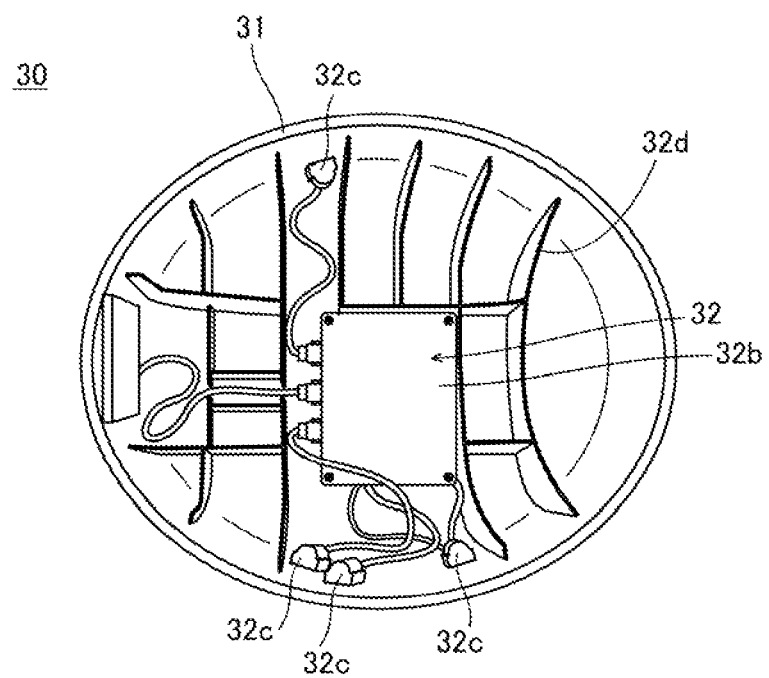
FIG. 4 is a back-side view of the jacket-type sensor.

A jacket-type sensor 30 is attached to the robot 10. As shown in FIGS. 3 and 4, the jacket-type sensor 30 includes a jacket 31 arranged to cover an exterior surface 11a of the robot arm 11, and a detector 32 included in the jacket 31 and configured to detect a touch on the jacket 31. The jacket 31 is formed of a resin, for example. The detector 32 includes detection lines 32a embedded in the jacket 31, and a board 32b configured to receive a signal from the detection lines 32a. The detector 32 is a pressure-sensitive touch sensor. The detector 32 may be constructed of a capacitive touch sensor. The detector 32 may be arranged in a part other than an interior of the jacket 31 (e.g., surface, etc.).

Figure 5:
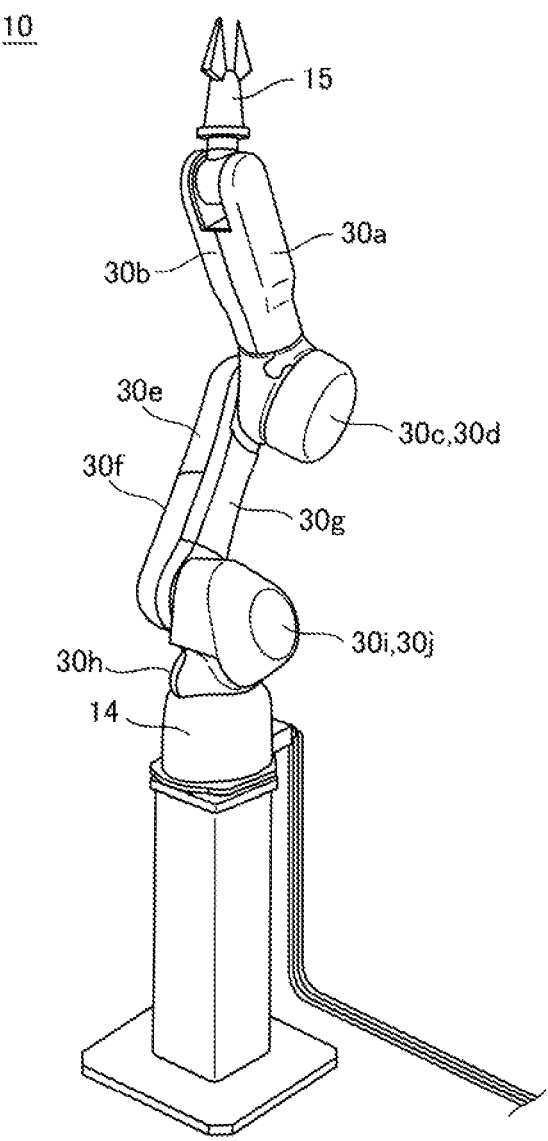
FIG. 5 is a perspective view of the robot (with the jacket-type sensor attached) according to the one embodiment.
Figure 6:
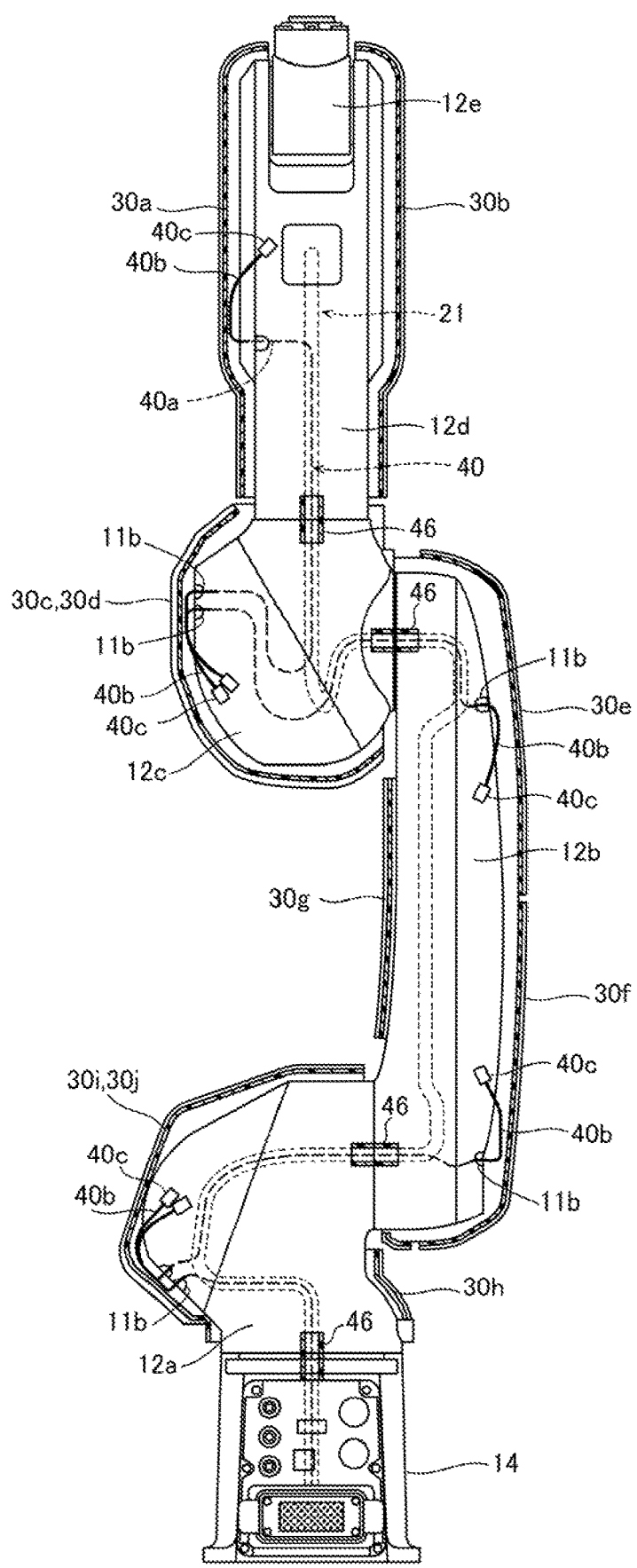
FIG. 6 is a cross-sectional diagram of an arm of the robot according to the one embodiment.

In this embodiment, as shown in FIGS. 5 and 6, a plurality of jacket-type sensors are provided as the jacket-type sensor 30, which is included in each of the plurality of link parts 12. The jacket-type sensors 30 includes jacket-type sensors 30a and 30b covering the link part 12d, jacket-type sensors 30c and 30d covering the link part 12c, jacket-type sensors 30e, 30f and 30g covering the link part 12b, and jacket-type sensors 30h, 30i and 30j covering the link part 12a.

As shown in FIGS. 3 and 4, the jackets 31 have convex shapes corresponding to the exterior surfaces 11a of the robot arm 11 (link parts 12) to cover the exterior surfaces 11a of the robot arm 11 (link parts 12). The jackets 31 have shapes (sizes) corresponding to shapes (sizes) of the link parts 12 to which the jackets are attached. The board 32b is arranged inside the convex jacket 31. Ribs 32d are formed on an interior side of the convex jacket 31.

In this embodiment, as shown in FIG. 6, the robot 10 includes a sensor wiring-line set 40 connected to the detectors 32, and configured to transmit detection results from detectors 32. The sensor wiring-line set 40 is arranged inside the robot arm 11. The sensor wiring-line set 40 is connected to the detector 32 of each of the plurality of jacket-type sensors 30, which is included in each of the plurality of link parts 12, and is arranged inside the robot arm 11. Parts 40a of the sensor wiring-line set 40 that are arranged inside the robot arm 11 are constructed of untied wiring lines (a plurality of wiring lines are not arranged and tied together) to prevent an increase of occupancy of the sensor wiring-line set in the robot arm 11. Also, parts 40b of the sensor wiring-line set 40 that are drawn to the outside of the robot arm 11 are constructed a waterproof and dust-proof cable (a cable including untied wiring lines covered by an electrically insulating film).

In this embodiment, as shown in FIG. 1, the plurality of jacket-type sensors 30 (30a to 30j) include daisy-chained parts daisy-chained to each other by the sensor wiring-line set 40. The sensor wiring-line set 40, which daisy-chains the plurality of jacket-type sensors 30, is arranged inside the robot arm 11. Specifically, the jacket-type sensor 30b and the jacket-type sensor 30a are connected to each other in series. In addition, the jacket-type sensor 30a is connected to the jacket-type sensor 30c through the sensor wiring-line set 41. Also, the jacket-type sensor 30c and the jacket-type sensor 30d are connected to each other in series. In addition, the jacket-type sensor 30d is connected to the jacket-type sensor 30e through a sensor wiring-line set 42. Also, the jacket-type sensor 30e and the jacket-type sensor 30g are connected to each other in series. In addition, the jacket-type sensor 30e is connected to the jacket-type sensor 30f. The jacket-type sensor 30f is connected to the jacket-type sensor 30h.

The jacket-type sensor 30f is connected to the jacket-type sensor 30i through a sensor wiring-line set 43. The jacket-type sensor 30i is connected to the jacket-type sensor 30j. In addition, the jacket-type sensor 30i is connected to a sensor wiring-line set 44.

In this embodiment, the robot system 100 includes a sensor control device 45 connected to the sensor wiring-line set 40 to receive detection results from the jacket-type sensors 30. Specifically, the sensor control device 45 is connected to the sensor wiring-line set 44 located inside the robot arm 11. If any one of the jacket-type sensors 30a to 30j detects a contact on the jacket 31, the detection result is provided to the sensor control device 45 through the sensor wiring-line set 40.

In this embodiment, the sensor wiring-line set 40 extends from the jacket-type sensor 30, passes through interiors of the robot arm 11 and the base 14, is drawn to the outside of the robot arm 11, and is then connected to the sensor control device 45. Specifically, a wiring-line-set side connector 40c connected to an end of the sensor wiring-line set 40 is attached to the base 14. A sensor-control-device side connector 45b is provided at an end of the wiring-line set 45a extending from the sensor control device 45. Thus, the sensor-control-device side connector 45b and the wiring-line-set side connector 40c are connected to each other.

In this embodiment, the sensor control device 45 is configured to provide a trigger signal to the robot control device 20, which controls the operation of the robot arm 11, when receiving a detection result indicating that a touch on the jacket 31 is detected from the jacket-type sensor 30 (any of the jacket-type sensors 30a to 30j). The robot control device 20 stops a function of driving the robot arm 11 in response to the trigger signal. Specifically, the robot control device 20 controls a function of driving electric motors (not shown) installed in the joints 13 of the robot arm 11. The sensor control device 45 is supplied with DC power from the robot control device 20. The sensor control device 45 may be directly supplied with power from the commercial power supply 1. Also, the robot control device 20 may be configured to reduce a moving speed of the robot arm 11 or to increase an angle(s) of the joint(s) of the robot arm 11 in accordance with the trigger signal.

In this embodiment, as shown in FIG. 6, the robot system 100 (robot 10) includes a robot wiring-line set 21 configured to supply at least one of signal and electric power (both the signal and electric power in this embodiment) to drive the robot arm 11 and arranged inside the robot arm 11. The sensor wiring-line set 40 is arranged along the robot wiring-line set 21 inside the robot arm 11. The robot wiring-line set 21 is arranged inside the link part 12a, the link part 12b, the link part 12c and the link part 12d. The robot wiring-line set 21 are arranged in the joints 13, and extends along the rotation axes of the joints 13. Specifically, cylindrical parts 46 are arranged on the rotation axes of the joints 13, and extend along the rotation axes so that the robot wiring-line set 21 is inserted into the cylindrical parts.

In this embodiment, the sensor wiring-line set 40 is arranged along the rotation axes of the joints 13 inside the robot arm 11. In other words, the sensor wiring-line set 40 and the robot wiring-line set 21 are inserted into the cylindrical parts 46 together.

Figure 7:
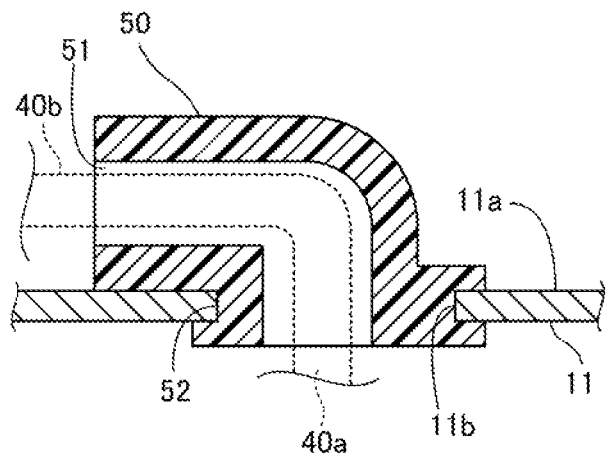
FIG. 7 is a cross-sectional view of a wiring-line-set insertion part.

In this embodiment, as shown in FIG. 7, the robot arm 11 has arm openings 11b through which the sensor wiring-line set 40 is inserted. The sensor wiring-line set 40 is inserted into the robot arm 11 through the arm opening 11b formed in the robot arm 11. The arm openings 11b are opened in the exterior surfaces 11a of the robot arm 11. The arm openings 11b has a size larger than a diameter of the sensor wiring-line set 40. That is, a gap is produced between each arm opening 11b and the sensor wiring-line set 40.

Figure 8:
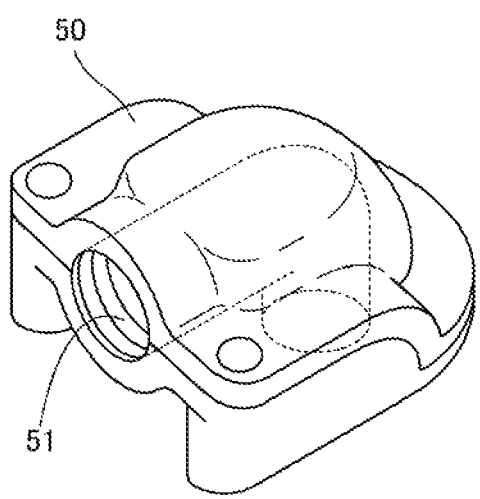
FIG. 8 is a perspective view of the wiring-line-set insertion part.

In this embodiment, as shown in FIGS. 7 and 8, the arm openings 11b receive wiring-line-set insertion parts 50 through which the sensor wiring-line set 40 is inserted. Each wiring-line-set insertion part 50 has a wiring-line-set guide hole 51 formed to guide a direction of the sensor wiring-line set 40 drawn from an interior of the robot arm 11 to an exterior surface 11a of the robot arm 11 to a direction along the exterior surface 11a of the robot arm 11. A robot arm 11 side of the wiring-line-set guide hole 51 extends in a direction orthogonal to the exterior surface 11a of the robot arm 11. The wiring-line-set guide hole 51 turns approximately 90 degrees above the exterior surface 11a of the robot arm 11, and extends along the exterior surface 11a of the robot arm 11. Accordingly, the sensor wiring-line set 40 is guided along the exterior surface 11a of the robot arm 11 by the wiring-line-set guide hole 51. Also, the wiring-line-set insertion part 50 has a groove 52 engaging the exterior surface 11a of the robot arm 11. The wiring-line-set insertion part 50 is formed of a resin, for example.

In this embodiment, the wiring-line-set insertion part 50 is configured to prevent a foreign substance from entering a gap between the arm opening 11b and the sensor wiring-line set 40. In other words, the wiring-line-set insertion part 50 is configured to close the gap between the arm opening 11b and the sensor wiring-line set 40.

In this embodiment, as shown in FIG. 2, the sensor wiring-line set 40 is drawn from the arm opening 11b, and has the wiring-line-set side connector 40c connected to the detector 32 at an end of a part 40b of the sensor wiring-line set that is drawn from the arm opening 11b. Each detector 32 includes a detector side connector 32c (see FIG. 1) connected to the wiring-line-set side connector 40c.

Specifically, as shown in FIG. 1, the detector side connector 32c of the jacket-type sensor 30a is connected to the wiring-line-set side connector 40c of the sensor wiring-line set 41. Also, the detector side connector 32c of the jacket-type sensor 30c is connected to the wiring-line-set side connector 40c of the sensor wiring-line set 41. Also, the detector side connector 32c of the jacket-type sensor 30d is connected to the wiring-line-set side connector 40c of the sensor wiring-line set 42. Also, the detector side connector 32c of the jacket-type sensor 30e is connected to the wiring-line-set side connector 40c of the sensor wiring-line set 42. Also, the detector side connector 32c of the jacket-type sensor 30f is connected to the wiring-line-set side connector 40c of the sensor wiring-line set 43. Also, the detector side connector 32c of the jacket-type sensor 30i is connected to the wiring-line-set side connector 40c of the sensor wiring-line set 43. Also, the detector side connector 32c of the jacket-type sensor 30i is connected to the wiring-line-set side connector 40c of the sensor wiring-line set 44.

Figure 9:
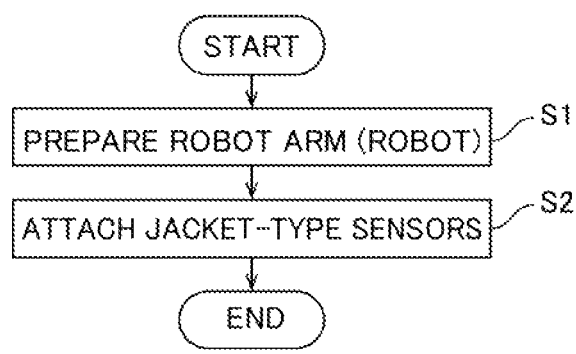
FIG. 9 is a flow diagram illustrating a robot-system assembling method.

The following description describes a method of assembling a robot system 100 with reference to FIG. 9.

In step S1, a robot arm 11 (robot 10) including a sensor wiring-line set 40 that is previously arranged inside the robot arm is prepared.

Subsequently, in step S2, jacket-type sensors 30 each of which includes a jacket 31 and a detector 32 included in the jacket 31 and configured to detect a touch on the jacket 31 and to provide a detection result is attached onto exterior surfaces 11a of the robot arm 11 so that the jacket-type sensors cover the robot arm. The jacket-type sensors 30 are attached to the robot arm 11, for example, by fasteners or an adhesive. In addition, in a process of attaching the jacket-type sensor (S2), the sensor wiring-line set 40, which is arranged inside the robot arm 11, and the detectors 32 are connected to each other. Specifically, the detector side connector 32c of the detector 32 is connected to the wiring-line-set side connector 40c of the sensor wiring-line set 40.

Advantages of the Embodiment

In this embodiment, the following advantages are obtained.

In this embodiment, as discussed above, the sensor wiring-line set 40, which is connected to the detector 32 of the jacket-type sensor 30 and configured to transmit a detection result from the detector 32, is arranged inside the robot arm 11. According to this configuration in which the sensor wiring-line set 40 is arranged inside the robot arm 11, even when a joint 13 of the robot arm 11 rotates, only a part of the sensor wiring-line set 40 that is located on the joint 13 is twisted around a joint axis together with the rotation of the joint 13, and as a result other part (part located other than the joint 13) of the sensor wiring-line set 40 is not pulled. In addition, because the sensor wiring-line set 40 connected to the detector 32 of the jacket-type sensor 30 is arranged inside the robot arm 11, dissimilar to a case in which a sensor wiring-line set 40 is arranged outside the robot arm 11, it is possible to prevent the sensor wiring-line set 40 from being caught on a part located around the robot arm. Consequently, it is possible to prevent the sensor wiring-line set 40 from being caught on a part located around the robot arm in a motion of the robot arm 11 while preventing obstruction of the motion of the robot arm 11. In addition, because the jacket-type sensor 30 is used, it is possible to detect a touch on the robot arm 11 in a relatively wide area of the robot arm.

In this embodiment, as discussed above, the robot arm 11 includes a plurality of link parts 12; a plurality of jacket-type sensors are provided as the jacket-type sensor 30, which is included in each of the plurality of link parts 12; and the sensor wiring-line set 40 is connected to the detector 32 of each of the plurality of jacket-type sensors 30, which is included in each of the plurality of link parts 12, and is arranged inside the robot arm 11. According to this configuration, because the sensor wiring-line set 40 is connected to the detector 32 of each of the plurality of jacket-type sensors 30, and is arranged inside the robot arm 11, even in a case in which a plurality of jacket-type sensors 30 are provided, it is possible to prevent the sensor wiring-line set 40 from being caught on a part located around the robot arm in a motion of the robot arm 11 while preventing obstruction of the motion of the robot arm 11.

In this embodiment, as discussed above, the plurality of jacket-type sensors 30 include daisy-chained parts daisy-chained to each other by the sensor wiring-line set 40; and the sensor wiring-line set 40, which daisy-chains the plurality of jacket-type sensors 30, is arranged inside the robot arm 11. Accordingly, as compared with a case in which each of plurality of jacket-type sensors 30 is provided with a sensor wiring-line set 40 (a case in which a plurality of jacket-type sensors 30 are connected in parallel to each other), the number of sensor wiring-line sets 40 can be reduced. As a result, space occupied by the sensor wiring-line set 40 in the robot arm 11 can be reduced.

In this embodiment, as discussed above, the sensor control device 45 is configured to provide a trigger signal to the robot control device 20 in response to reception of the detection result indicating that a touch on the jacket 31 is detected from the jacket-type sensor 30, and the robot control device 20 is configured to stop the function of driving the robot arm 11, to reduce a moving speed of the robot arm 11, or to increase an angle of the joint of the robot arm 11 in accordance with the trigger signal. As a result, even when the robot arm 11 (jacket-type sensor 30) comes into contact with a part located around the robot arm 11, the robot control device 20 can easily stop the function of driving the robot arm 11, reduce a moving speed of the robot arm 11 or increase an angle of the joint of the robot arm 11.

In this embodiment, as discussed above, the sensor wiring-line set 40 extends from the jacket-type sensor 30, passes through interiors of the robot arm 11 and the base 14, is drawn to the outside of the robot arm 11, and is then connected to the sensor control device 45. If the sensor wiring-line set 40 is drawn from the robot arm 11 to the outside, the sensor wiring-line set 40 drawn from the robot arm 11 may be caught by surrounding parts, etc. when the robot arm 11 moves. According to the configuration in which the sensor wiring-line set 40 passes through the interior of the base 14 and is drawn from the robot arm 11 to the outside as discussed above, because the base 14 is stationary, it is possible to prevent that surrounding parts, etc. catch the sensor wiring-line set 40, which passes through the interior of the base 14 and is drawn to the outside.

In this embodiment, as discussed above, the robot arm 11 has arm openings 11b through which the sensor wiring-line set 40 is inserted; and the sensor wiring-line set 40 is inserted into the robot arm 11 through the arm openings 11b formed in the robot arm 11. Accordingly, the sensor wiring-line set 40 can be easily inserted into the robot arm 11 through the arm openings 11b.

In this embodiment, as discussed above, each wiring-line-set insertion part 50 has a wiring-line-set guide hole 51 formed to guide a direction of the sensor wiring-line set 40 drawn from an interior of the robot arm 11 to an exterior surface 11a of the robot arm 11 to a direction along the exterior surface 11a of the robot arm 11. If the sensor wiring-line set 40 is drawn in a direction orthogonal to the exterior surface 11a of the robot arm 11, a drawn-out height (protrusion height) of the sensor wiring-line set 40 in proximity to the arm opening 11b will be relatively large. To address this, the sensor wiring-line set 40 is guided from an interior of the robot arm 11 along the exterior surface 11a of the robot arm 11 by the aforementioned configuration, and as a result the drawn-out height (protrusion height) of the sensor wiring-line set 40 in proximity to the arm opening 11b can be small. Accordingly, a thickness of the jacket-type sensor 30, which is arranged to cover the sensor wiring-line set 40, can be small, and consequently it is possible to prevent a size increase of the robot 10.

In this embodiment, as discussed above, the wiring-line-set insertion part 50 is configured to prevent a foreign substance from entering a gap between the arm opening 11b and the sensor wiring-line set 40. Accordingly, as compared with a case in which a member configured to prevent a foreign substance from entering a gap between the arm opening 11*b* and the sensor wiring-line set 40 is separately provided from the wiring-line-set insertion part 50, the number of parts that make up the robot system 100 can be reduced.

In this embodiment, as discussed above, the sensor wiring-line set 40 is drawn from the arm opening 11*b*, and has the wiring-line-set side connector 40*c* connected to the detector 32 at an end of a part 40*b* of the sensor wiring-line set that is drawn from the arm opening 11*b*, and each detector 32 includes a detector side connector 32*c* connected to the wiring-line-set side connector 40*c*. Accordingly, because the wiring-line-set side connector 40*c* is drawn from the arm opening 11*b*, the detector side connectors 32*c* connected to the detectors 32 of the jacket-type sensors 30 can be easily connected to the wiring-line-set side connector 40*c*. Consequently, the sensor wiring-line set 40 arranged inside the robot arm 11 can be easily electrically connected to the jacket-type sensors 30 arranged outside the robot arm 11.

In this embodiment, as discussed above, the sensor wiring-line set 40 is arranged along the rotation axes of the joints 13 inside the robot arm 11. Accordingly, even when rotation axes of the joints 13 rotate, only parts of the sensor wiring-line set 40 that are arranged along the rotation axes of the joints 13 are twisted together with the rotation of the joint 13, and as a result other parts (parts located other than the joint 13) of the sensor wiring-line set 40 are not pulled. Consequently, the sensor wiring-line set 40 does not necessarily have an excessively sufficient length, and as a result the length of the sensor wiring-line set 40 can be small.

In this embodiment, as described above, the sensor wiring-line set 40 is arranged along the robot wiring-line set 21 inside the robot arm 11. Accordingly, because the sensor wiring-line set 40 can be accommodated in space for accommodating the robot wiring-line set 21 inside the robot arm 11, space for accommodating the sensor wiring-line set 40 is not required to be formed in the robot arm 11. As a result, it is possible to prevent a size increase of the robot arm 11.

In this embodiment, as described above, the detector 32 includes detection lines 32*a* embedded in the jacket 31, and a board 32*b* configured to receive a signal from the detection lines 32*a*. Accordingly, when the board 32*b* detects an external force as output from the detection line 32*a*, a touch on the jacket 31 can be detected.

In this embodiment, as described above, because the sensor wiring-line set 40 is previously arranged inside the robot arm 11, the robot arm 11 can be easily retrofitted with the jacket-type sensor 30 (in installation site).

Modified Embodiment

Note that the embodiment disclosed this time must be considered as illustrative in all points and not restrictive. The scope of the present disclosure is not shown by the above description of the embodiments but by the scope of claims for patent, and all modifications or modified examples within the meaning and scope equivalent to the scope of claims for patent are further included.

While the example in which a plurality of jacket-type sensors 30 are provided has been shown in the aforementioned embodiment, the present disclosure is not limited to this. For example, only one jacket-type sensor 30 may be provided.

While the example in which jacket-type sensors 30 are attached to the robot arm 11 has been shown in the aforementioned embodiment, the present disclosure is not limited to this. For example, the jacket-type sensors 30 may be attached to the base 14 in addition to the robot arm 11.

While the example in which a plurality of jacket-type sensors 30 are connected to each other in series through the sensor wiring-line set 40 has been shown in the aforementioned embodiment, the present disclosure is not limited to this. For example, the plurality of jacket-type sensors 30 may be independently connected to the sensor wiring-line set 40. That is, the plurality of jacket-type sensors 30 may be connected in parallel to each other to the sensor control device 45.

While the example in which a sensor control device 45 configured to receive a detection result from the jacket-type sensor 30 and a robot control device 20 configured to control a function of driving of the robot arm 11 are provided separately from each other has been shown in the aforementioned embodiment, the present disclosure is not limited to this. For example, the control device configured to receive a detection result from the jacket-type sensor 30 and the control device configured to control a function of driving of the robot arm 11 may be provided as a common control device.

While the example in which the sensor wiring-line set 40 passes through an interior of the base 14, and is drawn (from the base 14) to the outside of the robot arm 11 has been shown in the aforementioned embodiment, the present disclosure is not limited to this. For example, the sensor wiring-line set 40 may be drawn from the robot arm 11 to the outside of the robot arm 11.

While the example in which the wiring-line-set insertion part 50 is held in the arm opening 11*b* has been shown in the aforementioned embodiment, the present disclosure is not limited to this. For example, the sensor wiring-line set 40 may be drawn through the arm opening 11*b* without the wiring-line-set insertion part 50 being provided in the arm opening 11*b*.

While the example in which the wiring-line-set insertion part 50 is configured to prevent a foreign substance from entering a gap between the arm opening 11*b* and the sensor wiring-line set 40 has been shown in the aforementioned embodiment, the present disclosure is not limited to this. For example, a member configured to prevent a foreign substance from entering a gap between the arm opening 11*b* and the sensor wiring-line set 40 may be provided separately from the wiring-line-set insertion part 50.

While the example in which the sensor wiring-line set 40 and the detectors 32 are connected to each other through connectors (wiring-line-set side connectors 40*c* and detector side connectors 32*c*) has been shown in the aforementioned embodiment, the present disclosure is not limited to this. For example, the sensor wiring-line set 40 and the detectors 32 may be connected to each other by means other than connection by connectors (such as soldering).

While the example in which the sensor wiring-line set 40 is arranged along the rotation axes of the joints 13 inside the robot arm 11 has been shown in the aforementioned embodiment, the present disclosure is not limited to this. For example, the sensor wiring-line set 40 may be spaced away from the rotation axes of the joints 13.

While the example in which the sensor wiring-line set 40 is arranged along the robot wiring-line set 21 inside the robot arm 11 has been shown in the aforementioned embodiment, the present disclosure is not limited to this. For example, the sensor wiring-line set 40 may be spaced away from the robot wiring-line set 21 in the robot arm 11.

While the example in which the detector 32 includes detection lines 32a embedded in the jacket 31 and a board 32b configured to receive a signal from the detection lines 32a has been shown in the aforementioned embodiment, the present disclosure is not limited to this. For example, the detector 32 may be constructed of components other than the detection lines 32a and the board 32b.

DESCRIPTION OF REFERENCE NUMERALS

11: robot arm
11a: exterior surface
11b: arm opening
12: link part
13: joint
14: base
20: robot control device
21: robot wiring-line set
30: jacket-type sensor
31: jacket
32: detector
32a: detection line
32b: board
32c: detector side connector
40: sensor wiring-line set
40b: parts (drawn from the arm opening)
40c: wiring-line-set side connector
45: sensor control device
50: wiring-line-set insertion part
51: wiring-line-set guide hole
100: robot system

The invention claimed is:

1. A robot system comprising:
a robot arm;
a jacket-type sensor including a jacket arranged to cover an exterior surface of the robot arm, and a detector included in the jacket and configured to detect a touch on the jacket;
a wiring-line-set insertion part; and
a sensor wiring-line set connected to the detector and configured to transmit a detection result from the detector, wherein
the sensor wiring-line set is arranged inside the robot arm,
the robot arm has an arm opening through which the sensor wiring-line set is inserted,
the sensor wiring-line set is inserted into the robot arm through the arm opening formed in the robot arm,
the wiring-line-set insertion part is arranged in the arm opening to receive the sensor wiring-line set inserted through the wiring-line-set insertion part,
the wiring-line-set insertion part has a wiring-line-set guide hole formed to guide a direction of the sensor wiring-line set drawn from the interior of the robot arm to the exterior surface of the robot arm to a direction along the exterior surface of the robot arm, and
the wiring-line-set insertion part includes an exterior portion formed on and extending along the exterior surface of the robot arm and with a part of the wiring-line-set enclosed in and extending inside the exterior portion.

2. The robot system according to claim 1, wherein
the robot arm includes a plurality of link parts;
a plurality of jacket-type sensors are provided as the jacket-type sensor, which is included in each of the plurality of link parts; and
the sensor wiring-line set is connected to the detector of each of the plurality of jacket-type sensors, which is included in each of the plurality of link parts, and is arranged inside the robot arm.

3. The robot system according to claim 2, wherein
the plurality of jacket-type sensors include daisy-chained parts daisy-chained to each other by the sensor wiring-line set; and
the sensor wiring-line set, which daisy-chains the plurality of jacket-type sensors, is arranged inside the robot arm.

4. The robot system according to claim 1 further comprising:
a sensor control device connected to the sensor wiring-line set, and configured to receive the detection result; and
a robot control device configured to control a function of driving of the robot arm, wherein
the sensor control device is configured to provide a trigger signal to the robot control device in response to reception of the detection result indicating that a touch on the jacket from the jacket-type sensor is detected, and
the robot control device is configured to stop the function of driving the robot arm, to reduce a moving speed of the robot arm, or to increase an angle of a joint of the robot arm in accordance with the trigger signal.

5. The robot system according to claim 4 further comprising
a base supporting the robot arm wherein
the sensor wiring-line set is drawn from the jacket-type sensor through interiors of the robot arm and the base to an outside of the robot arm, and is connected to the sensor control device.

6. The robot system according to claim 1, wherein the wiring-line-set insertion part is configured to prevent a foreign substance from entering a gap between the arm opening and the sensor wiring-line set.

7. The robot system according to claim 1, wherein
the sensor wiring-line set is drawn from an arm opening of the robot arm, and has a wiring-line-set side connector connected to the detector at an end of a part of the sensor wiring-line set that is drawn from the arm opening; and
the detector includes a detector side connector connected to the wiring-line-set side connector.

8. The robot system according to claim 1, wherein
the robot arm includes a plurality of link parts and a joint inside the robot arm connecting the plurality of link parts to each other; and
the sensor wiring-line set is arranged along a rotation axis of the joint inside the robot arm.

9. The robot system according to claim 1 further comprising a robot wiring-line set configured to supply at least one of a signal and electric power to drive the robot arm and arranged inside the robot arm, wherein
the sensor wiring-line set is arranged along the robot wiring-line set inside the robot arm.

10. The robot system according to claim 1, wherein the detector includes a detection line embedded in the jacket, and a board configured to receive a signal from the detection line.

11. A robot system comprising:
a robot arm that includes a jacket-type sensor including a jacket and a detector included in the jacket and configured to detect a touch on the jacket, the robot arm having an exterior surface configured to be covered by the jacket-type sensor;

a wiring-line-set insertion part; and a sensor wiring-line set connected to the detector and configured to transmit a detection result from the detector, wherein the sensor wiring-line set is arranged inside the robot arm, the robot arm has an arm opening through which the sensor wiring-line set is inserted, the sensor wiring-line set is inserted into the robot arm through the arm opening formed in the robot arm, the wiring-line-set insertion part is arranged in the arm opening to receive the sensor wiring-line set inserted through the wiring-line-set insertion part, the wiring-line-set insertion part has a wiring-line-set guide hole formed to guide a direction of the sensor wiring-line set drawn from the interior of the robot arm to the exterior surface of the robot arm to a direction along the exterior surface of the robot arm, and the wiring-line-set insertion part includes an exterior portion formed on and extending along the exterior surface of the robot arm and with a part of the wiring-line-set enclosed in and extending inside the exterior portion.

12. A robot-system assembling method comprising:

a step of preparing a robot arm including a sensor wiring-line set that is previously arranged inside the robot arm and a wiring-line-set insertion part; and a step of attaching, onto an exterior surface of the robot arm, a jacket-type sensor including a jacket and a detector included in the jacket and configured to detect a touch on the jacket and to provide a detection result whereby covering the robot arm with the jacket-type sensor, wherein the step of attaching a jacket-type sensor includes a step of connecting the sensor wiring-line set, which is arranged inside the robot arm, to the detector, the robot arm has an arm opening through which the sensor wiring-line set is inserted, the sensor wiring-line set is inserted into the robot arm through the arm opening formed in the robot arm, the wiring-line-set insertion part is arranged in the arm opening to receive the sensor wiring-line set inserted through the wiring-line-set insertion part, the wiring-line-set insertion part has a wiring-line-set guide hole formed to guide a direction of the sensor wiring-line set drawn from the interior of the robot arm to the exterior surface of the robot arm to a direction along the exterior surface of the robot arm, and the wiring-line-set insertion part includes an exterior portion formed on and extending along the exterior surface of the robot arm and with a part of the wiring-line-set enclosed in and extending inside the exterior portion.

* * * * *